United States Patent [19]

Niessner et al.

[11] Patent Number: 5,475,053

[45] Date of Patent: Dec. 12, 1995

[54] MOLDING COMPOSITION HAVING A MATT SURFACE

[75] Inventors: Norbert Niessner; Friedrich Seitz, both of Friedelsheim; Wolfgang Fischer, Ludwigshafen; Norbert Guentherberg, Speyer; Karl Ruppmich, Ludwigshafen; Rainer Moors, Limburgerhof; Robert Weiss, Ludwigshafen, all of Germany

[73] Assignee: BASF Aktiengesellschaft, Ludwigshafen, Germany

[21] Appl. No.: 259,165

[22] Filed: Jun. 13, 1994

Related U.S. Application Data

[63] Continuation of Ser. No. 82,581, Jun. 28, 1993, abandoned.

[51] Int. Cl.$^6$ .............................. C08L 55/02; C08L 51/04
[52] U.S. Cl. .................................. 525/64; 525/66; 525/67; 525/68; 525/71; 525/73; 525/77; 525/78; 525/279; 525/293
[58] Field of Search ........................... 525/64, 66, 67, 525/68, 71, 73, 77, 78, 279, 293

[56] References Cited

U.S. PATENT DOCUMENTS

| | | | |
|---|---|---|---|
| 4,169,869 | 10/1979 | Milenius | 525/87 |
| 4,612,345 | 9/1986 | Eichenauer et al. | 525/71 |
| 4,668,737 | 5/1987 | Eichenauer et al. | 525/73 |
| 5,342,898 | 8/1994 | Seitz et al. . | |
| 5,373,060 | 12/1994 | Guentherberg | 525/293 |

FOREIGN PATENT DOCUMENTS

| | | |
|---|---|---|
| 450511 | 10/1991 | European Pat. Off. . |
| 534211 | 3/1993 | European Pat. Off. . |
| 2057936 | 12/1985 | Germany . |
| 162750 | 7/1988 | Japan .......................... 525/66 |

OTHER PUBLICATIONS

Chem. Abst. DBase, CA110(2): 9370t (JP 63 125587).
Chem. Abst. DBase, CA 109(14): 111784x (JP 63 081 184).

*Primary Examiner*—David Buttner
*Attorney, Agent, or Firm*—Oblon, Spivak, McClelland, Maier & Neustadt

[57] ABSTRACT

A molding composition based on an impact-modified thermoplastic A selected from ABS, ASA, impact-resistant polystyrene (HIPS) impact resistant polymethyl methacrylate, impact resistant PVC, polycarbonate, polyester carbonate, polyester, polyamide, polyphenylene ether, polyether ketone, polyether sulfone, polysulfone, polyoxyalkylene, polyarylene sulfide and also mixtures thereof containing a matting agent B composed of 30 to 80% by weight of an elastomeric grafting base B1 of 75 to 99.8% by weight of an alkyl acrylate having 1 to 8 carbon atoms in the alkyl radical (B11), 0.1 to 5% by weight of a polyfunctional, crosslinking monomer (B12) and 0.1 to 20% by weight of a monomer containing one or more acidic groups, or 49.9 to 99.9% by weight of one or more dienes (B111), up to 50% by weight of a further ethylenically unsaturated monomer (B112) and 0.1 to 20% by weight of a monomer containing one or more acidic groups (B113), and 20 to 70% by weight of a graft sheath B2 composed of 40 to 99.9% by weight of an aromatic vinyl monomer (B21), up to 49.9% by weight of a polar, copolymerizable, ethylenically unsaturated monomer (B22) and 0.1 to 20% by weight of a monomer containing one or more basic groups (B23), and also a molding composition whose constituents B13 and B113 and B23 are interchanged.

2 Claims, No Drawings

MOLDING COMPOSITION HAVING A MATT SURFACE

This application is a continuation of application Ser. No. 08/082,581, filed on Jun. 28, 1993, now abandoned.

Polymers and polymer blends having a matt surface are becoming increasingly important in areas of application ion in which high toughness and low light reflection values (reduced glare) are required at the same time, as for example in automobile interiors or for utility articles that have to meet visually exacting standards, in order to avoid fingerprints.

One method of obtaining matt molded articles is to use coarsely particulate rubbers (cf. for example U.S. Pat. No. 4,169,869) or only slightly crosslinked rubbers (cf. for example DE-A-02 057 936) as grafting base, which are then grafted in a known manner and mixed with the thermoplastics to be matted.

This method has the disadvantage however that the toughness, hardness and processability are at the same time impaired.

Another method of matting is to mix the thermoplastics to be matted with neutral or acidic graft copolymers, which although they have the desired effect nevertheless produce a marked discoloration of the molding composition, which means that this route is not available to the plastics processor.

It is also known to use both acidic and basic monomers at the same time in a matt molding composition: DE 34 05 938 describes polymer mixtures having a matt surface that are based on graft copolymers containing acidic groups and thermoplastic resins containing basic groups. DE 34 21 353 describes the simultaneous use of both acidic and basic monomers in the graft sheath of a rubber component, and the use of these graft rubbers as matting agents.

Graft rubbers that contain acidic monomers in the base rubber and basic monomers in the graft sheath and also their production are described in EP 450 511, which discloses that such graft rubbers produce matt surfaces when mixed with brittle, ie. non-impact-modified polymers such as polyvinyl chloride, polymethyl methacrylate and styrene/acrylonitrile copolymers. However, it is more interesting from the technical aspect to substantially matt already impact-modified thermoplastics by adding small amounts of a matting agent with the toughness remaining unchanged or even being improved. This long-existing problem is solved in accordance with the invention by using graft rubbers as matting agent that contain acidic monomers in the base rubber and basic monomers in the graft sheath or basic monomers in the base rubber and acidic monomers in the graft sheath, and which can simply be added to existing impact-modified thermoplastics such as ABS, ASA, impact-resistant polystyrene (HIPS), polycarbonate/ABS, polycarbonate/ASA, polyphenylene ether/HIPS, impact-resistant polymethyl methacrylate, and impact-resistant PVC.

The matting agent is according to the invention a graft copolymer (hereinafter identified as B) composed of B1: 30 to 80% by weight of an elastomeric grafting base of B11: 75 to 99.8% by weight of an alkyl acrylate with 1 to 8 carbon atoms in the alkyl radical B12: 0.1 to 5 % by weight of a polyfunctional, crosslinking monomer, B13: 0.1 to 20 % by weight of a monomer containing one or more acidic groups or B111: 49.9 to 99.9% by weight of one or more dienes B112: up to 50% by weight of a further ethylenically unsaturated monomer B113: 0.1 to 20% by weight of a monomer containing one or more acidic groups, and B2: 20 to 70% by weight of a graft sheath of B21: 40 to 99.9% by weight of an aromatic vinyl monomer B22: up to 49.9% by weight of a polar, copolymerizable, ethylenically unsaturated monomer B23: 0.1 to 20% by weight of a monomer containing one or more basic groups, or a graft polymer corresponding to claim 2.

The thermoplastic A to be matted comprises in particular impact-modified thermoplastics composed of the components A1+A2, of which only a few preferred examples are listed hereinafter, and also (if necessary also impact-modified) thermoplastics selected from polycarbonates, polyesters, polyester carbonates, polyamides, polyether ketones, polyether sulfones, polysulfones, polyoxyalkylenes, polyarylene sulfides, polyphenylene ethers or mixtures thereof. The matt molding composition may contain the matting agent according to the invention in an amount of, for example, from 0.1 to 60, preferably from 0.5 to 40, and particularly preferably from 2 to 20% by weight (based on the sum of all the components).

ABS and ASA polymers are particularly preferred, and generally consist of at least one graft copolymer (component A1) and at least one thermoplastic (component A2), which generally contains the graft copolymers in dispersed form. The thermoplastics A3, which may be used both as the sole component A, ie. not impact-modified, and mixed with component A1 and/or component A2 are also preferred.

Graft copolymers A1 are prepared by grafting at least one of the monomers A12 listed hereinafter onto at least one of the grafting bases A11 listed hereinafter.

However, in individual cases it may happen that the component A1 does not have a graft sheath, ie. is a one-stage compound, but is nevertheless (partially) compatible with the thermoplastic component A2. In this case component A1 is identical to the description of the rubbers A11.

The rubber A11 may be for example natural rubber, epichlorohydrin rubbers, ethylene-vinyl acetate rubbers, polyethylenechlorosulfonic rubbers, silicone rubbers, polyether rubbers, diene rubbers, hydrogenated diene rubbers, polyalkenamer rubbers, acrylate rubbers, ethylene-propylene rubbers, ethylene-propylene-diene rubbers, butyl rubbers, and fluorinated rubbers. Acrylate rubbers, butadiene rubbers, ethylene-propylene-diene rubbers, hydrogenated butadiene and isoprene rubbers, or silicone rubbers are preferred.

Acrylate rubbers include for example alkyl acrylate rubbers based on one or more $C_1$–$C_8$-alkyl acrylates, and in particular based on butyl, hexyl, octyl and 2-ethylhexyl acrylate. These alkylacrylate rubbers may contain up to 30% by weight of copolymerized monomers such as vinyl acetate, (meth)acrylonitrile, styrene, substituted styrene, methyl methacrylate and vinyl ether. These acrylate rubbers may furthermore contain, copolymerized, up to 10% by weight, preferably 1 to 5% by weight based on the monomers used to produce the rubber base, of crosslinking, polyfunctional monomers. Examples are monomers that contain two or more double bonds able to participate in the copolymerization, which are not conjugated in the 1,3-position. Suitable crosslinking monomers are for example divinylbenzene, diallyl maleate, diallyl fumarate, diallyl phthalate, triallyl cyanurate, triallyl isocyanurate, triallyl phosphate and allyl methacrylate. A particularly suitable crosslinking monomer is the acrylic acid ester of tricyclodecenyl alcohol (cf. DE-C-12 60 135).

Suitable acrylate rubbers also include products that contain a crosslinked diene rubber composed of one or more conjugated dienes such as polybutadiene, or a copolymer of a conjugated diene with an ethylenically unsaturated monomer such as styrene and/or acrylonitrile, as core, and one or more further graft sheaths, at least one of which is an acrylate rubber.

Diene rubbers are for example homopolymers of conjugated dienes with 4 to 8 carbon atoms, such as butadiene, isoprene, piperylene and chloroprene, copolymers of such dienes with one another, and copolymers of such dienes with styrene compounds, acrylic or methacrylic compounds (for example acrylonitrile, methacrylonitrile, acrylic acid, methacrylic acid, butyl acrylate, ethylhexyl acrylate, and methyl methacrylate).

Particularly preferred diene rubbers are butadiene, butadiene-styrene, butadiene-methyl methacrylate, butadiene-butylacrylate, and butadiene-acrylonitrile rubbers.

Suitable silicone rubbers include for example crosslinked silicone rubbers composed of units of the formulae $R_2SiO$, $RSiO_{3/2}$, $R_3SiO_{1/2}$ and $SiO_{2/4}$, where R is a monovalent radical. The amount of the individual siloxane units should be chosen so that 0 to 10 mole units of the formula $RSiO_{3/2}$, 0 to 1.5 mole units of the formula $R_3SiO_{1/2}$ and 0 to 3 mole units of the formula $SiO_{2/4}$ are present per 100 units of the formula $R_2SiO$. R may be either a monovalent saturated hydrocarbon radical with 1 to 18 carbon atoms, a phenyl or alkoxy radical, or a group such as the vinyl or mercaptopropyl radical that is susceptible to free-radical attack. Preferably at least 80% of all radicals R are methyl; particularly preferred are combinations of methyl and ethyl or methyl.

Preferred silicone rubbers contain incorporated units of groups susceptible to free-radical attack, in particular vinyl, alkyl, halogen or mercapto groups, preferably in amounts of 2 to 10 mol % based on all radicals R.

Such silicone rubbers may be produced for example according to the details given in EP-A-260 558.

Suitable monomers for forming the graft sheath A12 are selected from at least one of the following groups A121 and A122.

A121:

Styrene and its substituted derivatives, for example α-methylstyrene, α-chlorostyrene, p-chlorostyrene, 2,4-dichlorostyrene, p-methylstyrene, 3,4-dimethylstyrene, p-tert-butylstyrene, o- and p-divinylbenzene, p-methyl-α-methylstyrene and p-chloro-α-methylstyrene, and methylmethacrylate; styrene, α-methylstyrene and methyl methacrylate are preferred. A122:

Acrylic and methacrylic compounds, for example acrylonitrile, methacrylonitrile, acrylic and methacrylic acids, methyl acrylate, ethyl acrylate, n- and isopropyl acrylate, n- and isobutyl acrylate, tert-butyl acrylate, 2-ethylhexyl acrylate, methyl methacrylate, ethyl methacrylate, n- and isopropyl methacrylate, n- and isobutyl methacrylate, tert-butyl methacrylate, cyclohexyl methacrylate, isobornyl methacrylate, maleic anhydride and its derivatives, such as maleic acid esters, maleic acid diesters and maleimide, for example alkyl and acrylic maleimides such as methyl maleimide or phenyl maleimide; acrylonitrile, methyl methacrylate, maleic anhydride and phenyl maleimide are preferred.

Preferred processes for preparing A1 are emulsion, solution, bulk or suspension polymerization. The polymers A1 may be prepared in a particularly preferred manner by free-radical emulsion polymerization. In particular the graft copolymers A1 can be prepared by free-radical emulsion graft polymerization of the monomers A12 in the presence of rubber latices of the component A11 at from 20° to 90° C. using water-soluble or partially oil-soluble initiators such as peroxodisulfate, or with the aid of redox initiators. In the case of redox initiators the polymerization temperature may also be below 20° C.

Rubbers that are already composed of pre-formed core/jacket rubber particles may however also be used. For example, the core may be composed of a polybutadiene rubber or a silicone rubber, or else of a styrene or methyl methacrylate homopolymer or copolymer, e.g. styrene/acrylonitrile. The jacket may then for example be composed of an acrylate (EP-A-260 558). One or more graft sheaths can be applied to the plastics particles by simple grafting or repeated stepwise grafting, each graft sheath being able to have a different composition. In addition to the grafting monomers, polyfunctional monomers containing crosslinking or reactive groups may also be grafted on (for example according to EP-A-230 282, DE-A-36 01 419 and EP-A-269 861).

The component A is composed of 0.1 to 60% by weight, preferably 0.5 to 40% by weight and in particular 2 to 20% by weight of the graft copolymer (elastomer) A1, and 40 to 99.9% by weight, preferably 60 to 99.5 and in particular 80 to 98% by weight of the resin matrix A2.

The elastomers A1 contain in general 10 to 100% by weight, preferably 20 to 90 and particularly preferably 30 to 75% by weight of base rubber A11, and up to 90% by weight, preferably 10 to 80, and particularly preferably 25 to 70% by weight of graft-copolymerized monomers A12.

The monomers A121 are used in an amount of 50 to 100% by weight, preferably 60 to 95% by weight, and the monomers A122 are used in an amount of up to 50%, preferably of 5 to 40% by weight.

The rubbers are present in these polymers A11 generally in the form of completely or partially crosslinked particles. The median particle size d(50) of the polymers A1 is between 0.05 and 10 μm, preferably between 0.08 and 1 μm.

As component A2 according to the invention, vinyl polymers and (meth)acrylic polymers may be prepared as homopolymers and copolymers from the monomers mentioned in A121 and A122. Examples of suitable homopolymers and copolymers are polystyrene, polymethyl methacrylate, styrene-acrylonitrile copolymers, α-methylstyrene-acrylonitrile copolymers, styrene-maleic anhydride copolymers, styrene-phenylmaleimide copolymers, styrene/methyl methacrylate copolymers, methyl methacrylate/acrylonitrile copolymers, styrene-acrylonitrile-maleic anhydride copolymers, styrene-acrylonitrile-phenylmaleimide copolymers, α-methylstyrene-acrylonitrilemethyl methacrylate copolymers, α-methylstyrene-acrylonitrile-tert-butyl methacrylate copolymers, and styrene-acrylonitrile-tert-butyl methacrylate copolymers.

Such copolymers are frequently formed during graft polymerization to produce the graft copolymer A1, particularly if large amounts of monomers A12 are grafted onto small amounts of rubber A11. The vinyl polymers and (meth)acrylic polymers may be prepared by means of known free-radical, anionic and cationic polymerization processes. Also, the known redox polymerization or the known polymerization using organometallic mixed catalysts may be advantageous.

As thermoplastics to be matted according to the invention there may also be used the amorphous and partly crystalline components described hereinafter under A3, alone or mixed with the components A1 and/or A2. In a preferred embodiment mixtures comprising one or more of the following thermoplastics A3 together with one or more components listed under A1 and A2 may be used as thermoplastics A according to the invention.

In a particularly preferred embodiment mixtures of 5 to 95% by weight of component (A1+A2) and 5 to 95% by weight of component A3 are used as polymers to be matted.

Blend components A according to the invention are for example mixtures of polycarbonate (A3) together with the aforedescribed graft copolymers A1 and thermoplastics A2. Such mixtures are already commercially available, for example under the trade name Bayblend® or Terblend S®. These compounds are PC/ABS and PC/ASA mixtures. In these mixtures the polycarbonate proportion is preferably between 5 and 95% by weight, and the proportion of the components (A1+A2) is between 5 and 95% by weight.

Suitable polycarbonates A3 are for example those based on diphenols of the formula (I)

HO—Ar—A—A—OH     (I)

where

Ar is an aryl radical (phenyl, phenylalkyl, halogen-substituted aryl),

A is a single bond, $C_1$–$C_3$-alkylene, $C_2$–$C_3$-alkylidene, $C_3$–$C_6$-cycloalkylidene groups, and —S— or —$SO_2$—.

Preferred diphenols of the formula (I) are for example hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)-cyclohexane. 2,2-bis(4-hydroxyphenyl)propane and 1,1-bis(4-hydroxyphenyl)cyclohexane are particularly preferred.

The diphenols of the formula (I) are known per se or can be prepared by known methods.

The diphenols of the formula (I) may be used either individually or else as a mixture to prepare the polycarbonates.

Suitable polycarbonates may be branched in a conventional manner, and preferably by the incorporation of 0.05 to 2.0 mol %, based on the sum of the diphenols used, of at least trifunctional compounds, for example those with three or more phenolic OH groups.

Polycarbonates that have relative viscosities $N_{rel}$ from 1.10 to 1.50, in particular from 1.25 to 1.40, have proved particularly suitable. These viscosities correspond to average molecular weights $M_w$ (average weight) of 10,000 to 200,000, preferably 20,000 to 80,000.

The polycarbonates may be prepared for example by reacting diphenols of the formula (I) with phosgene according to the phase interface method, or with phosgene according to the homogeneous phase method (pyridine method), the molecular weight that is to be established in each case being achieved in a known manner by using a corresponding amount of known chain terminators (with regard to polydiorganosiloxane-containing polycarbonates, see for example DE-A-33 34 782).

Suitable chain terminators are for example phenol, p-tert-butylphenol, and also long-chain alkylphenols such as 4-(1, 3-tetramethylbutyl)phenol, according to DE-A-28 42 005, or monoalkylphenols or dialkylphenols with a total of 8 to 20 carbon atoms in the alkyl substituents, according to DE-A-35 06 472, for example p-nonylphenol, 3,5-di-tert-butylphenol, p-tert-octylphenol, p-dodecylphenol, 2-(3,5-dimethylheptyl)phenol and 4-(3,5dimethylheptyl)phenol.

As thermoplastics A3 there may also be used polycarbonate-polysiloxane block copolymers, polycarbonate-polyether block copolymers, and polycarbonatepolyester block copolymers.

According to the invention, as thermoplastics A3 there may furthermore be used aromatic polyesters and polyester carbonates. These thermoplastics comprise at least one aromatic bisphenol of the formula (I), at least one aromatic dicarboxylic acid, and optionally carbonic acid or its derivatives, such as phosgene, dialkyl carbonate and diaryl carbonate. Suitable aromatic dicarboxylic acids are for example orthophthalic acid, terephthalic acid, isophthalic acid, tert-butylisophthalic acid, 3,3'-biphenyldicarboxylic acid, 4,4'-biphenyldicarboxylic acid, 4,4'-benzophenonedicarboxylic acid, 3,4'-benzophenonedicarboxylic acid, 4,4'-oxydiphenyldicarboxylic acid, 4,4'-sulfonyldiphenyldicarboxylic acid, 2,2-bis(4-carboxyphenyl)propane and trimethyl-3-phenylindan-4,5-dicarboxylic acid.

Of the aromatic dicarboxylic acids, terephthalic acid and/or isophthalic acid are particularly preferred. As regards the bisphenols, the preferences mentioned in connection with formula (I) apply.

Aromatic polyesters and polyester carbonates may be prepared by processes that are known from the literature for preparing polyester and polyester carbonates, for example processes in homogeneous solution, according to melt transesterification processes and according to the two-phase interface process. Melt transesterification processes (acetate process and phenylester process, described for example in U.S. Pat. Nos. 3,494,885; 4,386,186; EP-A-26 120, 26 121, 26 684, 28 030, 39 854, 79 075, 91 602, 97 970, 146 887, 156 103, 234 913, 234 919, 240 301) and in particular the two-phase interface process (described for example in EP-A-68 014, 88 322, 134 898, 151 750, 182 189, 219 708, 272 426) are preferably used.

Aliphatic-aromatic polyesters are for example amorphous polyesters prepared from cyclohexane-1,4-dimethanol and terephthalic acid and/or isophthalic acid, which may also contain as comonomers other dicarboxylic acids and aliphatic dihydroxy compounds incorporated by condensation, for example glycol, propylene glycol and butylene glycol. Examples of such polyesters are cyclohexane-1,4-dimethanol/terephthalic acid polyesters, cyclohexane-1,4-dimethanol/terephthalic acid/isophthalic acid copolyesters, and cyclohexane-1,4-dimethanol/terephthalic acid/ethylene glycol copolyesters. Such polyesters are described for example in EP-A-273 151, 273 152, 155 989, 226 974, 185 309, 152 825, 226 189, 272 416 and U.S. Pat. Nos. 4,188,314 and 4,634,737.

As thermoplastics A3 there may furthermore be used partly crystalline aromatic-aliphatic polyesters. Examples are polyalkylene terephthalates, for example based on ethylene glycol, 1,3-propanediol, 1,4-butanediol, 1,6-hexanediol and 1,4-bishydroxymethyl-cyclohexane. Polyethylene terephthalates, polybutylene terephthalates and copolymers of cyclohexane-1,4-dimethanol and ethylene glycol as well as terephthalic acid are particularly preferred. Polybutylene terephthalate is especially preferred.

The molecular weights $M_w$ (average weight) of these polyalkylene terephthalates are in general between 10,000 and 500,000, and preferably between 10,000 and 80,000. The preparation, for example transesterification, is described for example in U.S. Pat. Nos. 2,647,885, 2,643,989, 2,534,028, 2,578,660, 2,742,494 and 2,901,466.

Thermoplastics A3 that may be used according to the invention include amorphous polyamides. These are obtained for example by polycondensation in diamines, such as ethylenediamine, 2,2,4- and 2,4,4-trimethylhexamethylenediamine, m- and p-xylylenediamine, bis(4-aminocyclohexyl)methane, mixtures of 4,4'- and 2,2'-diaminodicyclohexylmethanes, 2,2-bis(4-aminocyclohexyl)propane, 3,3'-dimethyl-4,4'-diaminodicyclohexyl)propane, 3,3'-dimethyl-4,4'-diaminodicyclohexylmethane, 3-aminoethyl-3,5,5-trimethylcyclohexylamine, 2,5- bis(aminomethyl)norbornane, 2,6-bis(aminomethyl)norbornane and 1,4-diaminomethylcyclohexane, and of any desired mixtures of these diamines with dicarboxylic acids, for example with oxalic acid, malonic acid, succinic acid, adipic acid, azelaic acid, decanedicarboxylic acid, dodecanedicarboxylic acid, heptadecanedicarboxylic acid, 2,2,4-trimethyladipic acid, 2,4,4-trimethyladipic acid, isophthalic acid and terephthalic acid, and with any desired mixtures of these dicarboxylic acids. Amorphous copolyamides that are obtained by polycondensation of several of the aforementioned diamines and/or dicarboxylic acids are therefore also included. Furthermore amorphous copolyamides are included that are prepared by the co-use of ω-aminolauric acid and its lactams.

Particularly suitable amorphous thermoplastic polyamides are those that can be obtained from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis(aminomethyl)norbornane, those that can be obtained from isophthalic acid, 4,4'-diaminodicyclohexylmethane and ω-caprolactam, those that can be obtained from isophthalic acid, 3,3'-dimethyl-4,4'-diaminodicyclohexylmethane and ω-laurolactam, and those that can be obtained from terephthalic acid and 2,2,4- and/or 2,4,4-trimethylhexamethylenediamine.

Instead of pure 4,4'-diaminodicyclohexylmethane, mixtures of the positionally isomeric diaminodicyclohexylmethanes may also be used.

The amorphous polyamides and their preparation are known (see for example Ullmann, Encyclopädie der technischen Chemie, Vol. 19, p. 50).

Suitable thermoplastics A3 are for example also partly crystalline polyamides, for example polyamide-6, polyamide-6,6, polyamide-4,6, polyamide-6,12 and partly crystalline copolyamides based on these components. Also suitable are partly crystalline polyamides whose acidic component is composed wholly or partly (for example in addition to ε-caprolactam) of adipic acid and/or terephthalic acid and/or isophthalic acid and/or suberic acid and/or sebacic acid and/or azelaic acid and/or dodecanedicarboxylic acid and/or a cyclohexanedicarboxylic acid, and whose diamine component is wholly or partly composed in particular of m- and/or p-xylylenediamine and/or hexamethylenediamine and/or 2,2,4- and/or 2,4,4-trimethylhexamethylenediamine and/or isophoronediamine, and whose compositions are known in principle from the prior art (see for example Encyclopedia of Polymers, Vol. 11, p. 315 ff).

Furthermore, partly crystalline polyamides are suitable that are prepared wholly or partly from lactams with 6 to 12 carbon atoms, optionally with the co-use of one or more of the aforementioned diamines.

Particularly preferred partly crystalline polyamides are polyamide-6 and polyamide-6,6 or copolyamides with a small proportion, for example up to about 10% by weight, of other co-components.

Further suitable thermoplastics A3 are aromatic polyether ketones (described for example in the following patents: GB 1 078 234, U.S. Pat. No. 4,010,147, EP 135 938, 292 211, 275 035, 280 998, 165 406 and in the publication by C. K. Sham et al., Polymer 29/6, 1016–1020 (1988)). These polyether ketones may be obtained for example by reacting bisphenols with bis(haloaryl)ketones in polar aprotic solvents in the presence of alkali carbonates, for example lithium carbonate. The reaction of hydroquinone with 4,4'-difluorobenzophenone may be mentioned by way of example.

Also suitable as thermoplastics A3 are polyether sulfones and polysulfones.

Polyoxyalkylenes, for example polyoxymethylene, are furthermore suitable as thermoplastics A3. Their preparation is known to the person skilled in the art. Quite generally, these polymers contain at least 50 mol % of recurring —$CH_2O$— units in the main polymer chain.

The homopolymers are generally prepared by polymerizing formaldehyde or trioxane in the presence of suitable catalysts.

Within the scope of the invention polyoxymethylene copolymers (ie. trioxane copolymers) are preferred, in particular those that contain, in addition to the recurring —$CH_2O$— units, also up to 50, preferably 0.1 to 20, and in particular 0.3 to 10 mol % of recurring

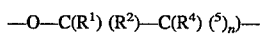

units, where $R^1$ to $R^4$ are, independently of one another, a hydrogen atom, a $C_1$–$C_4$-alkyl group with 1 to 4 carbon atoms, and $R^5$ is a —$CH_2$—, —$CH_2O$—, a $C_1$–$C_4$-alkyl group or $C_1$- to $C_4$-haloalkyl substituted methylene group or a corresponding oxymethylene group, and n has a value in the range from 0 to 3.

The corresponding monomers are for example ethylene oxide, 1,2-propylene oxide, 1,2-butylene oxide, 1,3-butylene oxide, 1,3-dioxane, 1,3-dioxolane and 1,3-dioxepan as cyclic ethers, and also linear oligoformals or polyformals such as polydioxolane or polydioxepan.

Also suitable are oxymethylene terpolymers, which are obtained for example by reacting trioxane, one of the aforedescribed cyclic ethers, and a third monomer, preferably a bifunctional compound of the formula

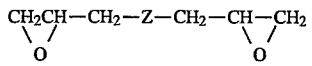

where Z is a chemical bond, —O—, —ORO— (where R is $C_1$–$C_8$-alkylene or $C_2$–$C_8$-cycloalkylene).

Preferred monomers of this type are ethylene diglycide, diglycidyl ethers and diethers of glycidyls and formaldehyde, dioxane or trioxane in a molar ratio of 2:1, and also diethers of 2 moles of a glycidyl compound and 1 mole of an aliphatic diol having 2 to 8 carbon atoms, such as the diglycidyl ethers of ethylene glycol, 1,4-butanediol, 1,3-butanediol, 1,3-cyclobutanediol, 1,2-propanediol and 1,4-cyclohexanediol, to name only a few.

The preferred polyoxymethylene copolymers have melting points of at least 150° C. and molecular weights (average weight) $M_w$ in the range from 5000 to 150,000, preferably from 7000 to 100,000. Terminal groupstabilized polyoxymethylene polymers that have C—C bonds at the chain ends are particularly preferred.

Finally, suitable thermoplastics A3 include polyarylene sulfides, in particular polyphenylene sulfide. The preparation of such compounds is known and is described for example in U.S. Pat. Nos. 3,354,129, 3,786,035, 3,853,824, 3,856,560, 3,862,095 and EP-A-171 021.

The reaction product according to the invention is now described hereinafter. The reaction product is a graft copolymer that is built up from a grafting base comprising B1: 30 to 80% by weight of an elastomeric grafting base of
B11: 75 to 99.8% by weight of an alkyl acrylate with 1 to 8 carbon atoms in the alkyl radical
B12: 0.1 to 5% by weight of a polyfunctional, crosslinking monomer, B13: 0.1 to 20% by weight of a monomer containing one or more acidic groups or B111: 49.9 to 99.9% by weight of one or more dienes B112: up to 50% by weight of a further ethylenically unsaturated monomer B113: 0.1 to 20% by weight of a monomer containing one or more acidic groups, and B2: 20 to 70% by weight of a graft sheath of B21: 40 to 99.9% by weight of an aromatic vinyl monomer B22: up to 49.9% by weight of a polar, copolymerizable, ethylenically unsaturated monomer B23: 0.1 to 20% by weight of a monomer containing one or more basic groups.

The graft copolymers B according to the invention preferably comprise 55 to 75% by weight of B1 and 25 to 45% by weight of B2; the proportions of the individual constituents, in each case based on B1 and B2, should preferably be:

B11: 92 to 99.6% by weight

B12: 0.2 to 4% by weight

B13: 0.2 to 15% by weight

B111: 80 to 99.8% by weight

B112: 0 to 20% by weight

B113: 0.2 to 15% by weight

B21: 55 to 84.8% by weight

B22: 15 to 40% by weight

B23: 0.2 to 15% by weight.

Monomers B21 to B23, which are not combined with the graft core in the course of the grafting but are simply incorporated as occluded polymers, are counted as part of the graft sheath. B21 to B23 thus specify the amounts added in the preparation.

The following may be said specifically as regards the particulate graft copolymers B according to the invention, their constituents, their preparation, and the formulation of corresponding molding compositions:

The particulate graft polymers are obtained from a grafting base (rubber) B1 and a graft sheath B2 in a manner known per se. The rubber B1 is either a crosslinked acrylic ester polymer or a diene copolymer having a glass transition temperature of below 0° C., preferably below −20° C., and particularly preferably below −30° C. (the glass transition temperature is determined for example by the TLC method; K. H. Illers, Makromol. Chemie 127 (1969) p. 1).

Suitable monomers B11 are acrylic esters having 1 to 8 carbon atoms, at least in some cases with 4 to 8 carbon atoms, in the alkyl radical. n-Butyl acrylate and ethylhexyl acrylate may in particular be mentioned as suitable monomers. The acrylic esters may in each case be used alone or else mixed with one another.

In order to obtain good mechanical properties it has proved necessary to crosslink the acrylic ester polymer used as grafting base. To this end the polymerization of the acrylic ester is carried out in the presence of 0.1 to 5% by weight, preferably 0.2 to 4% by weight based on the total weight of the monomers used in the preparation of the grafting base, of a copolymerizable, polyfunctional monomer B12 effecting the crosslinking. Suitable monomers are those that contain at least two ethylenic double bonds capable of participating in the copolymerization and that are not conjugated in the 1,3-position. Examples are divinyl benzene, diallyl maleate, diallyl fumarate, diallyl phthalate, allyl methacrylate, triallyl cyanurate or triallyl isocyanurate. The acrylic ester of tricyclodecenyl alcohol has proved particularly suitable as crosslinking monomer (cf. DE-PS 12 60 135).

The monomer mixture used for the preparation of the grafting base also contains 0.1 to 20% by weight, preferably 0.2 to 15% by weight, of one or more monomers containing one or more acidic groups (B113) or (B13). Suitable acidic groups are in particular carboxylic acid or sulfonic acid groups. Preferred acidic monomers B13 (B13) are $\alpha,\beta$-unsaturated carboxylic acids such as acrylic acid or methacrylic acid, and also citraconic acid, crotonic acid, fumaric acid, itaconic acid, maleic acid, vinylsulfonic acid, vinylbenzenesulfonic acid or cinnamic acid.

Suitable monomers B111 are butadiene, isoprene and their derivatives, and also optionally a styrene monomer B112 and, likewise if necessary, one of the aforementioned comonomers B113 (or B13) with an acidic group.

The graft copolymer can be prepared according to the method described in DE-PS 12 60 135. For this purpose the grafting base B1 is first of all prepared; if the grafting base is to be an acrylic rubber, the acrylic ester or esters B11, the polyfunctional monomer B12 and the acidic monomer B13 according to the invention are polymerized in aqueous emulsion at 20° to 100° C., preferably between 50° and 80° C. Conventional emulsifiers may be used, such as alkali salts of alkylsulfonic or alkylarylsulfonic acids, alkyl sulfates, fatty alcohol sulfonates, salts of higher fatty acids having 10 to 30 carbon atoms, or resin soaps. Sodium salts of alkanesulfonates or of fatty acids having 10 to 18 carbon atoms are preferably used. The emulsifiers are expediently used in an amount of 0.5 to 5% by weight, in .particular 1 to 2% by weight, based on the total weight of the monomers used to prepare the grafting base. In general a water/monomer ratio of 2:1 to 0.7:1 is employed. Polymerization initiators include in particular the conventional persulfates, e.g. potassium peroxodisulfate; redox systems are however also suitable. The amount of initiators (for example 0.1 to 1% by weight based on the total weight of the monomers) is governed in a known manner according to the desired molecular weight.

As polymerization auxiliaries the conventional buffer substances may be used, by means of which the pH is adjusted to preferably 6 to 9, for example sodium bicarbonate and sodium pyrophosphate, and also up to 3% by weight of a molecular weight regulator such as mercaptan, terpinol or dimeric $\alpha$-methylstyrene.

The exact polymerization conditions, in particular the nature, metering and amount of the emulsifier are determined within the aforementioned ranges so that the obtained latex of the crosslinked acrylic ester polymer has a $d_{50}$ value in the range from about 30 to 1000 nm, preferably in the range from 50 to 800 nm.

If a diene rubber is to be the graft core, the following procedure is expediently adopted:

The elastomer, the grafting base B1 is prepared by polymerizing B111 alone, possibly together with the further comonomers, in aqueous emulsion in a manner known per se at temperatures of 20° to 100° C. preferably from 50° to 80° C. The conventional emulsifiers may be used, such as alkali salts of alkylsulfonic or alkylarylsulfonic acids, alkyl sulfates, fatty alcohol sulfonates, salts of higher fatty acids having 10 to 30 carbon atoms, or resin soaps. The sodium salts of alkanesulfonates or fatty acids having 10 to 18 carbon atoms are preferably used. It is expedient to use the emulsifiers in amounts of 0.5 to 5% by weight, in particular 0.5 to 2% by weight, based on the monomers used in the preparation of the grafting base B1. In general the polymerization is performed at a water to monomer ratio of 2:1 to 0.7:1. Polymerization initiators that are used are in particular the conventional persulfates, such as potassium persulfate, though redox systems may also be used. The initiators are generally used in amounts of 0.1 to 1% by weight, based on the monomers used in the preparation of the grafting base A. As further polymerization auxiliaries the conventional buffer substances may be used, by means of which the pH is adjusted to preferably 6 to 9, for example sodium bicarbonate and sodium pyrophosphate; furthermore, as a rule 0.1 to 3% by weight of a molecular weight regulator, such as mercaptans, terpinols or dimeric α-methylstyrene, is used in the polymerization.

The exact polymerization conditions, in particular the type, metering and amount of the emulsifier, are specifically selected within the aforementioned ranges so that the latex of the polymer A obtained has a $d_{50}$ value in the range from about 100 to 750 nm, preferably in the range from 100 to 600 nm. Alternatively, however, the emulsion polymer having an average particle size in the range from 60 to 150 nm is agglomerated in a conventional way (cf. DE-B-24 27 960).

Graft sheath B2

In order to prepare the graft copolymer from the core and graft sheath, a monomer mixture comprising 50 to 99.9% by weight of at least one aromatic vinyl monomer B21, up to 49.9% by weight of at least one polar, copolymerizable monomer B22, and 0.1 to 20% by weight of at least one basic monomer B23 is polymerized in the presence of the obtained latex B1. Examples of aromatic vinyl monomers are styrene, α-methylstyrene and nuclear-alkylated styrenes such as p-methylstyrene and tert-butylstyrene. Styrene, α-methylstyrene and p-methyl-styrene are particularly preferred. Examples of polar, copolymerizable, ethylenically unsaturated monomers B2 are acrylonitrile, methacrylonitrile, and alkyl acrylates and alkyl methacrylates having 1 to 4 carbon atoms in the alkyl radical. Acrylonitrile, methyl methacrylate and mixtures thereof are preferred. Suitable basic monomers B23 are monomers copolymerizable with B21 and B22 that contain at least one basic group in the molecule. Preferred monomers B23 contain a tertiary amino group in the molecule. Examples of these are: dimethylaminoethyl (meth)acrylate, morpholine methacrylate, N-vinylimidazole, p-dimethylaminostyrene, N-vinylcarbazole, N-vinylindole, N-vinylpyrrole, 4-vinylpyrimidine, 2-vinylpyridine, 3-vinylpyridine, 4-vinylpyridine, as well as their mixtures. Particularly preferred monomers are esters of acrylic acid or methacrylic acid with aliphatic alcohols containing a tertiary amino group in the alkyl radical. Dimethylaminoethyl acrylate and methacrylate may be mentioned as examples. Preferred monomer mixtures contain 55 to 84.8 (70 to 79.5) % by weight of styrene and/or α-methylstyrene, 15 to 40 (20 to 35) % by weight of acrylonitrile and 0.2 to 15 (0.5 to 5) % by weight of the basic compound, dimethylaminoethyl acrylate being preferred.

The graft copolymerization onto the polymer serving as grafting base B1 is in turn advantageously carried out in aqueous emulsion. The copolymerization may be carried out in the same system as the polymerization of the grafting base, and further emulsifiers and initiators may be added. However, these must not be identical to the emulsifiers and initiators used in the preparation of the grafting base B1. Thus, it may for example be expedient to use a persulfate as initiator for the preparation of the grafting base B1, but to use a redox initiator system for the polymerization of the grafting sheath B2. Also, the comments made regarding the preparation of the grafting base B1 apply to the choice of emulsifier, initiator and polymerization auxiliaries. The monomer mixture to be grafted on may be added to the reaction mixture all at once, batchwise in several stages, or preferably continuously during the polymerization. The graft copolymerization is controlled so as to achieve a degree of grafting of 20 to 70% by weight, preferably 25 to 60% by weight. For the purposes of the invention the degree of grafting is the proportion (in %) of the graft monomers B2 in the overall graft polymer B.

In a further preferred embodiment B13 is 0.1 to 20% by weight, preferably 0.2 to 15% by weight of at least one monomer containing one or more basic groups, and the component B23 is 0.1 to 20% by weight, preferably 0.2 to 15% by weight, of at least one monomer containing one or more acidic groups.

This further, preferred embodiment thus contains acidic monomers in the graft sheath and basic monomers in the grafting base of the graft rubber B.

These monomers containing acidic and basic groups have already been described in detail hereinbefore. All other previous descriptions concerning the component B and its constituents obviously also apply to the above further, preferred embodiment.

The thermoplastic molding compositions according to the invention may contain, as further constituents, additives conventionally used in thermoplastic molding compositions. Examples of such additives are: fillers, further compatible plastics, antistatics, antioxidants, flameproofing agents, lubricants, dyes and pigments. The additives are used in conventional amounts, preferably in amounts of up to 30% by weight, based on the total weight of the thermoplastic molding composition. Compatible plastics may also account for a higher proportion.

The compositions according to the invention can be processed by the methods conventionally used for thermoplastics processing, for example extrusion and injection molding, into a very wide range of molded articles, for example window profiles, garden furniture, boats, plates, lamp covers, automobile parts and children's toys. The compositions according to the invention are particularly suitable for producing molded articles in which a high impact resistance is required. The molding compositions according to the invention have a considerably matter surface than those of the prior art.

The parameters described in the present application were determined as follows:

1. The reported median particle size denotes in all cases the weight average particle size as determined by means of an analytical ultracentrifuge corresponding to the method of W. Scholtan and H. Lange, Kolloid-Z. and Z.-Polymere 250 (1972), pp. 782 to 796. The ultracentrifuge measurement provides the cumulative weight distribution of the particle diameter of a sample. From this it can be deduced what percentage by weight of the particles have a diameter equal to or less than a specific value. The median particle diameter, which is also termed the $d_{50}$ value of the cumulative weight distribution, is defined as the value at which 50 percent by weight of the particles have a smaller, and 50 percent by weight of the particles have a larger, diameter than the $d_{50}$ value.

2. The notched impact strength [in $kJ/m^2$] of the products was measured according to DIN 53 453 on injection-molded standard small rods at 23° C. A sample series was in each case investigated at an injection temperature of 250° C. The results obtained for the examples are summarized in Table 2.

3. The viscosity numbers [in $cm^3/g$] were measured in a 0.5% strength solution in methyl ethyl ketone. Gel fractions were removed by centrifugation before the measurement and the weighed quantity was correspondingly corrected.

4. For the gloss measurements the molding compositions according to the invention were injected into roundels on an Allrounder type injection molding machine supplied by Arburg, at a melt temperature of 250° C. and a mold temperature of 60° C. The gloss measurements were carried out according to DIN 67 530 on a Dr. Lange UME 1 reflectometer under an angle of incidence of 45° C.

5. The total penetration energy [in Nm] was determined according to DIN 53 443 on roundels (Ø 60 mm, thickness 2 mm) injection molded at 250° C. The test temperature was 23° C.

EXAMPLES

Parts and percentages are by weight unless otherwise stated.

1. Preparation of the matting agents B (1) and B (2), and of the acrylate-based comparative component B (4).

1.1 Preparation of a grafting base B1

160 g of the monomer mixture specified in Table 1 (see B (1), B (2) and comparative component B (4)) for the preparation of the grafting base B1 were heated to 60° C. in 1500 g of water while stirring, with the addition of 5 g of the sodium salt of a $C_{12}$- to $C_{18}$-paraffinsulfonic acid, 3 g of potassium peroxodisulfate, 3 g of sodium bicarbonate and 1.5 g of sodium pyrophosphate. 10 minutes after the initiation of the polymerization reaction, a further 840 g of the mixture specified in Table 1 were added within 3 hours. After all the monomer had been added the emulsion was kept for one hour at 60° C.

1.2 Preparation of a graft sheath B2

1.2.1 Example B (1) and comparative component B (4)

2100 g of the emulsion prepared according to the above procedure (1.1) were mixed with 1150 g of water and 2.7 g of potassium peroxodisulfate, and heated to 65° C. while stirring. After the reaction temperature was reached, 560 g of the monomer mixture specified in Table 1 for the preparation of the graft sheath B2 were metered in over 3 hours. After the end of the addition the emulsion was kept for 2 hours at 65° C. The graft polymer was precipitated from the emulsion at 95° C. by means of calcium chloride solution, washed with water, and dried in a warm current of air.

1.2.2 Example B (2)

The reaction was carried out in a similar manner to 1.2.1, but with the following differences:

4873 g of emulsion 1.1 were mixed with 1855 g of water and 5.1 g of potassium peroxodisulfate. 1280 g of a monomer mixture from Table 1 were metered in.

2. Preparation of the matting agent B (3) based on butadiene 2.1 Preparation of a grafting base B1

A polybutadiene latex is prepared by polymerizing 594 g of butadiene in 800 ml of water at 65° C. in the presence of a solution of 6 g of tert-dodecyl mercaptan, 6 g of methacrylic acid, 7 g of sodium $C_{14}$-alkanesulfonate as emulsifier, 2 g of potassium peroxodisulfate and 2 g of sodium pyrophosphate. The conversion is 98%. The average particle size is 100 nm.

The latex obtained is agglomerated by adding 25 g of an emulsion of a copolymer comprising 96 parts of ethyl acrylate and 4 parts of methacrylamide having a solids content of 10% by weight, a polybutadiene latex having a median particle size of 350 nm being obtained.

2.2 Preparation of the particulate graft polymers B2

After adding 400 g of water, 4 g of sodium $C_{14}$-alkylsulfonate and 2 g of potassium peroxodisulfate, 400 g of a mixture of styrene, acrylonitrile and the basic component in the ratios specified in Table 1 are added within 4 hours. The polymerization is effected by stirring the batch at 75° C. The conversion is virtually quantitative, based on styrene-acrylonitrile. The graft rubber dispersion obtained is precipitated with calcium chloride solution and the separated graft copolymer is washed with distilled water and dried.

3. Preparation of the comparative component B (5) was performed according to EP 62901

4. Preparation of the comparative component B (6) was performed according to DE 31 49 358, p. 16, line 9 to p. 27, line 3.

5. Mixture of the matting agents with impact-modified thermoplastics and comparative components The following were used as component A:

SAN=A copolymer of styrene and acrylonitrile in a weight ratio of 65:35 having a viscosity number of 80 ml/g (0.5% by weight in dimethylformamide, 23° C.), prepared by continuous solution polymerization, described for example in Kunststoffhandbuch, Vieweg-Daumiller, Vol. V (Polystyrene), Carl-Hanser-Verlag, Munich, 1969, p. 124, lines 12 ff.

PPE=Polyphenylene ether blend comprising 40% by weight of poly-2,6-dimethyl-1,4-phenylene ether (molecular weight range $M_w$=24,000 to 39,000) and 60% by weight of impact resistant polystyrene (KR 2710 from BASF).

PC=A commercially available polycarbonate based on bisphenol A having a relative solution viscosity $\eta_{rel}$ of 1.3 ml/g, measured in a 0.5% by weight solution in dichloromethane at 23° C.

Kraton G 1650=block rubber from Shell AG AK 100, 000=silicone oil from Wacker Chemie The aforedescribed components B (1) to B (6) are used as components B.

The mixtures according to Table 2 were made into granules in each case at 250° C. in a ZSK 30 twin-screw extruder from Werner & Pfleiderer. The granules were then injection molded into test articles as specified.

The mixing is illustrated hereinafter by way of example on the basis of Table 2, Example 3, and also Comparative Example V-3.

EXAMPLE 3

20 parts of a polybutadiene graft rubber prepared as described in EP 0062901 are mixed with 10 parts of a graft rubber according to the invention, by a method similar to Example 2, and 70 parts of a SAN with 35 AN in a ZSK-30. The resulting material has a notched impact strength of $a_k$=15 kJ/mm$^2$ and a gloss of 15% reflection.

COMPARATIVE EXAMPLE V-3

30 parts of a polybutadiene graft rubber prepared as described in EP 0062901 are mixed with 70 parts of a SAN with 35 AN in a ZSK-30. The resulting material has a notched impact strength of $a_k$=11 kJ/mm$^2$ and a gloss of 62% reflection.

TABLE 1

Composition of the matting agents B according to the invention, and also comparative examples

|  | B (1) |  | B (2) |  | B (3) |  | Comparison B (4) and B (6) |  | Comparison B (5) |  |
|---|---|---|---|---|---|---|---|---|---|---|
| Grafting base B1*) | BA | 96 | BA | 96 | BU | 99 | BA | 98 | BU | 100 |
|  | DCPA | 2 | DCPA | 1 | MAS | 1 | DCPA | 2 |  |  |
|  | MAS | 2 | MAS | 3 |  |  |  |  |  |  |
| Graft sheath B2*) | S | 73 | S | 95 | S | 68 | S | 75 | S | 70 |
|  | AN | 23 | DMAEA | 5 | AN | 30 | AN | 25 | AN | 30 |
|  | DMAEA | 4 |  |  | DMAEA | 2 |  |  |  |  |

BA: n-Butyl acrylate
DCPA: Dicyclopentadienyl acrylate
MAS: Methacrylic acid
BU: Butadiene
S: Styrene
AN: Acrylonitrile
DHAEA: N,N-Dimethylaminoethyl acrylate
*)The sum of the specified monomers is in each case 100 parts by weight

TABLE 2

Mixing of the matting agent according to the invention with impact-modified thermoplastics and comparative examples

|  | Example | | | | | | | | | |
|---|---|---|---|---|---|---|---|---|---|---|
|  | 1 | 2 | 3 | 4 | V-1 | V-2 | V-3 | V-4 | V-5 | V-6 |
| Component A | SAN 70 | PPE 93 Kraton 3 AK 100,000 1 | SAN 70 | PC 60 SAN 20 | SAN 70 | PPE 96 Kraton 3 AK 100,000 1 | SAN 70 | PC 60 SAN 20 | SAN 70 | SAN 70 |
| Component B | B(1) 10 B(4) 20 | B(2) 3 | B(3) 10 B(5) 20 | B(1) 10 B(6) 10 | B(4) 30 | — | B(5) 30 | B(6) 20 | B(1) 30 | B(2) 30 |
| Notched impact strength [kJ/m$^2$] | 8 | 7 | 15 | 36 | 5–6 | 6 | 11 | 36 | 8 |  |
| Gloss (%) | 14 | 9 | 15 | 53[2] | 60 | 13 | 62 | 55[2] | 5 | 4 |
| Total penetration energy [Nm] | 38 | 31 | — | 60 | 55 | 11 | — | 59 | 5 |  |

[1] All figures are in each case in by weight, based on 100% A + B
[2] At a melt temperature of 260° C. instead of 250° C.

We claim:

1. A molding composition, comprising (A) an impact-modified thermoplastic selected from the group consisting of:

(i) a graft copolymer comprising a core of polymer (A1) and a sheath of a polymer (A2);
(ii) a mixture of a polymer (A1) and a polymer (A3);
(iii) a mixture of a polymer (A2) and a polymer (A3);
(iv) a mixture of a polymer (A3) and a graft copolymer comprising a core of a polymer (A1) and a sheath of a polymer (A2); and
(v) polymer (A3), wherein said polymer (A1) is selected from the group consisting of natural rubber, epichlorohydrin rubbers, ethylene-vinyl acetate rubbers, polyethylenechlorosulfonic rubbers, silicone rubbers, polyether rubbers, diene rubbers, hydrogenated diene rubbers, polyakenamer rubbers, acrylate rubbers, ethylene-propylene rubbers, ethylene-propylene-diene rubbers, butyl rubbers, and fluorinated rubbers;

said polymer (A2) is selected from the group consisting of polymers of styrene, α-methylstyrene, α-chlorostyrene, p-chlorostyrene, 2,4-dichlorostyrene, p-methylstyrene, 3,4-dimethylstyrene, p-tert-butylstyrene, o- and p-divinylbenzene, p-methyl-α-methylstyrene, p-chloro-αmethylstyrene, methylmethacrylate, acrylonitrile, methacrylonitrile, acrylic and methacrylic acids, methyl acrylate, ethyl acrylate, n- and isopropyl acrylate, n- and isobutyl acrylate, tert-butyl acrylate, 2-ethylhexyl acrylate, methyl methacrylate, ethyl methacrylate, n- and isopropyl methacrylate, n- and isobutyl methacrylate, tert-butyl methacrylate, cyclohexyl methacrylate, isobornyl methacrylate, maleic anhydride, maleic acid esters, maleic acid diesters, methyl maleimide, phenyl maleimide, and mixtures thereof;

said polymer (A3) is selected from the group consisting of polycarbonates, polycarbonate-polysiloxane block copolymers, polycarbonate-polyether block copolymers, polycarbonate-polyester block copolymers, aromatic polyesters, polyester carbonates, aliphatic-aromatic polyesters, amorphous polyamides, partially crystalline polyamides, aromatic polyether ketones, polyether sulfones, polysulfones, polyoxyalkylenes, and polyarylene sulfides; and (B) 0.1 to 60% by weight, based on the total weight of said molding composition, of a matting agent comprising:
- B1: 30 to 80% by weight of an elastomeric grafting base of:
  - B11: 75 to 99.8% by weight of an alkyl acrylate with 1 to 8 carbon atoms in the alkyl radical,
  - B12: 0.1 to 5% by weight of a polyfunctional, crosslinking monomer, and
  - B13: 0.1 to 20% by weight of a monomer containing one or more basic groups, or
  - B111: 49.9 to 99.9% by weight of one or more dienes,
  - B112: up to 50% by weight of a further ethylenically unsaturated monomer, and
  - B113: 0.1 to 20% by weight of a monomer containing one or more basic groups, and
- B2: 20 to 70% by weight of a graft sheath of:
  - B21: 40 to 99.9% by weight of an aromatic vinyl monomer,
  - B22: up to 49.9% by weight of a polar, copolymerizable, ethylenically unsaturated monomer, and
  - B23: 0.1 to 20% by weight of a monomer containing one or more acidic groups.

2. A molding composition, comprising (A) an impact-modified thermoplastic selected from the group consisting of ABS, ASA, impact resistant polystyrene (HIPS), impact resistant polymethyl methacrylate, impact resistant PVC, polycarbonate, polyester polycarbonate, polyester, polyamide, polyphenylene ether, polyether ketone, polyether sulfone, polysulfone, polyoxyalkylene, polyarylene sulfide, and mixtures thereof; and (B) 0.1 to 60% by weight, based on the total weight of said molding composition, of a matting agent comprising:
- B1: 30 to 80% by weight of an elastomeric grafting base of:
  - B11: 75 to 99.8% by weight of an alkyl acrylate with 1 to 8 carbon atoms in the alkyl radical,
  - B12: 0.1 to 5% by weight of a polyfunctional, crosslinking monomer, and
  - B13: 0.1 to 20% by weight of a monomer containing one or more basic groups, or
  - B111: 49.9 to 99.9% by weight of one or more dienes,
  - B112: up to 50% by weight of a further ethylenically unsaturated monomer, and
  - B113: 0.1 to 20% by weight of a monomer containing one or more basic groups, and
- B2: 20 to 70% by weight of a graft sheath of:
  - B21: 40 to 99.9% by weight of an aromatic vinyl monomer,
  - B22: up to 49.9% by weight of a polar, copolymerizable, ethylenically unsaturated monomer, and
  - B23: 0.1 to 20% by weight of a monomer containing one or more acidic groups.

* * * * *

UNITED STATES PATENT AND TRADEMARK OFFICE
CERTIFICATE OF CORRECTION

PATENT NO. : 5,475,053
DATED : December 12, 1995
INVENTOR(S) : Norbert Niessner et al.

It is certified that error appears in the above-indentified patent and that said Letters Patent is hereby corrected as shown below:

On the title page, Item [30], the Foreign Application Priority Data, should read:

--Jun. 29, 1992 [DE] GERMANY..............P 42 21 293.6--

Signed and Sealed this

Second Day of April, 1996

*Attest:*

BRUCE LEHMAN

*Attesting Officer*   *Commissioner of Patents and Trademarks*